US011262850B2

(12) United States Patent
Heo et al.

(10) Patent No.: US 11,262,850 B2
(45) Date of Patent: Mar. 1, 2022

(54) NO-HANDED SMARTWATCH INTERACTION TECHNIQUES

(71) Applicant: AUTODESK, INC., San Rafael, CA (US)

(72) Inventors: Seongkook Heo, Busan (KR); George Fitzmaurice, Toronto (CA); Benjamin Lafreniere, Toronto (CA); Tovi Grossman, Toronto (CA)

(73) Assignee: AUTODESK, INC., San Rafael, CA (US)

( * ) Notice: Subject to any disclaimer, the term of this patent is extended or adjusted under 35 U.S.C. 154(b) by 113 days.

(21) Appl. No.: 15/650,816

(22) Filed: Jul. 14, 2017

(65) Prior Publication Data

US 2018/0024642 A1 Jan. 25, 2018

Related U.S. Application Data

(60) Provisional application No. 62/364,809, filed on Jul. 20, 2016.

(51) Int. Cl.
*G06F 3/01* (2006.01)
*G06F 3/0488* (2013.01)
*G06F 1/16* (2006.01)

(52) U.S. Cl.
CPC .............. *G06F 3/017* (2013.01); *G06F 1/163* (2013.01); *G06F 3/0488* (2013.01)

(58) Field of Classification Search
CPC ............................... G06F 3/017; G06F 3/0304
See application file for complete search history.

(56) References Cited

U.S. PATENT DOCUMENTS

| 8,021,269 | B2* | 9/2011 | Jung | A43B 3/0005 |
| | | | | 482/4 |
| 8,228,292 | B1* | 7/2012 | Ruiz | G06F 1/1694 |
| | | | | 345/156 |
| 9,372,535 | B2* | 6/2016 | Bailey | A61B 5/0488 |
| 9,513,703 | B2* | 12/2016 | Whitney | G06F 3/014 |
| 9,565,286 | B2* | 2/2017 | Chung | H04W 76/14 |
| 9,600,030 | B2* | 3/2017 | Bailey | G06F 1/163 |
| 9,652,135 | B2* | 5/2017 | Seo | G06F 3/04847 |
| 9,880,632 | B2* | 1/2018 | Ataee | G06F 3/017 |

(Continued)

OTHER PUBLICATIONS

Akkil et al., Glance Awareness and Gaze Interaction in Smartwatches. Ext. Abstracts CHI 2015, ACM Press (2015), 1271-1276.

(Continued)

*Primary Examiner* — Patrick F Marinelli
(74) *Attorney, Agent, or Firm* — Artegis Law Group, LLP

(57) ABSTRACT

Via no-handed inputs to a smartwatch, an end-user can initiate various smartwatch operations when either or both hands of the end-user are occupied. The smartwatch includes a suite of sensors for capturing inertial, acoustic, and optical data. The smartwatch also interfaces with a handheld mobile computing device and/or a shoe-mounted pedometry device to capture additional sensor data. A control engine executing on the smartwatch processes captured sensor data and identifies no-handed inputs performed by the end-user. The control engine maps these no-handed inputs to specific commands that can be executed on the smartwatch to initiate smartwatch operations.

17 Claims, 12 Drawing Sheets

(56) References Cited

U.S. PATENT DOCUMENTS

| | | | | |
|---|---|---|---|---|
| 2006/0286972 A1* | 12/2006 | Kates | | H04M 1/05 455/415 |
| 2010/0281432 A1* | 11/2010 | Geisner | | G06F 3/017 715/849 |
| 2011/0018794 A1* | 1/2011 | Linsky | | G06F 1/163 345/156 |
| 2011/0199393 A1* | 8/2011 | Nurse | | A43B 3/00 345/665 |
| 2011/0234492 A1* | 9/2011 | Ajmera | | G06F 3/017 345/158 |
| 2014/0160078 A1* | 6/2014 | Seo | | G06F 3/017 345/175 |
| 2014/0168057 A1* | 6/2014 | Ahuja | | G06F 3/017 345/156 |
| 2015/0007042 A1* | 1/2015 | Gay | | G06F 3/0484 715/744 |
| 2015/0046867 A1* | 2/2015 | Moore | | G06F 3/0481 715/781 |
| 2015/0051898 A1* | 2/2015 | Cuthbert | | G06F 40/58 704/3 |
| 2015/0054732 A1* | 2/2015 | Bailey | | G08C 17/02 345/156 |
| 2015/0070270 A1* | 3/2015 | Bailey | | A61B 5/0488 345/156 |
| 2015/0185837 A1* | 7/2015 | Whitney | | G06F 3/014 345/156 |
| 2015/0277540 A1* | 10/2015 | Jackson | | G06F 1/3265 345/169 |
| 2015/0338926 A1* | 11/2015 | Park | | G06F 3/011 345/156 |
| 2016/0246444 A1* | 8/2016 | Mattice | | G06F 3/0416 |
| 2016/0252975 A1* | 9/2016 | Lee | | H04W 4/025 345/173 |
| 2016/0299570 A1* | 10/2016 | Davydov | | G06F 1/163 |
| 2016/0328023 A1* | 11/2016 | Mistry | | G06F 3/014 |
| 2016/0366266 A1* | 12/2016 | Chung | | H04W 76/14 |
| 2016/0378193 A1* | 12/2016 | Camacho Perez | | G06F 3/017 345/156 |
| 2017/0076581 A1* | 3/2017 | Felch | | G08B 21/245 |
| 2017/0186306 A1* | 6/2017 | Felch | | G08B 21/245 |
| 2017/0336870 A1* | 11/2017 | Everett | | G06F 3/016 |
| 2017/0351345 A1* | 12/2017 | Nirjon | | G06F 3/014 |
| 2018/0024642 A1* | 1/2018 | Heo | | G06F 3/017 |
| 2018/0081447 A1* | 3/2018 | Gummadi | | G06F 3/017 |

OTHER PUBLICATIONS

Amento et al., "The sound of one hand: A Wrist-mounted Bio-acoustic Fingertip Gesture Interface" Ext. Abstracts CHI 2002, ACM Press Apr. 20-25, 2002, pp. 724-725.

Anderson et al., "Supporting Subtlety with Deceptive Devices and Illusory Interactions" In Proc. CHI 2015, ACM Press (2015), 1489-1498.

Ashbrook, D.L., "Enabling mobile microinteractions", PhD Thesis. Georgia Institute of Technology, Atlanta, GA, May 2010, 186 pages.

Bailly et al., "ShoeSense: A New Perspective on Hand Gestures and Wearable Applications" In Proc. CHI 2012, ACM Press (2012), 1239-1248.

Caramiaux, "Understanding Gesture Expressivity through Muscle Sensing", ACM Transactions on Computer-Human Interaction. 21, 6 (Jan. 2015), 1-26.

Chen et al., X.A., Swipeboard: A Text Entry Technique for Ultra-Small Interfaces That Supports Novice to Expert Transitions. In Proc. UIST 2014, ACM Press Oct. 5-8, 2014, pp. 615-620.

Crossan et al., "Foot tapping for mobile interaction" In Proc. BCS 2010, British Computer Society (2010), 418-422.

Deyle et al., "Hambone: A bio-acoustic gesture interface" In Proc. ISWC 2007 IEEE (2007), pp. 3-10.

Ens, "Candid Interaction: Revealing Hidden Mobile and Wearable Computing Activities" In Proc. UIST 2015, ACM Press Nov. 8-11, pp. 467-476.

Esteves et al., Orbits: Gaze Interaction for Smart Watches using Smooth Pursuit Eye Movements. In Proc. UIST 2015, ACM Press Nov. 8-11, 2015, pp. 457-466.

Frith, C. "Role of facial expressions in social interactions" Philosophical transactions of the Royal Society of London. Series B, Biological sciences. 364, 1535 (2009), 3453-3458.

Georgi et al., "Recognizing Hand and Finger Gestures with IMU based Motion and EMG based Muscle Activity Sensing", In Proc. BioSignals 2015, ScitePress (2015), pp. 99-108.

Wakabayashi, D., "Apple Watch Users Discover Another Way to Go Hands Free", Wall Street Journal. Dec. 25, 2015, 4 pages.

Google, Android Wear Wrist gestures.: https://support.google.com/androidwear/answer/6312406. Snapshot dated Apr. 30, 2016 retrieved from https://web.archive.org/web/20160430101405/https://support.google.com/androidwear/answer/6312406.

Harison et al., "Skinput: Appropriating the Body as an Input Surface", In Proc. CHI 2010, ACM Press Apr. 10-15, 2010, pp. 453-462.

Holz et al., "Bodyprint: Biometric User Identification on Mobile Devices Using the Capacitive Touchscreen to Scan Body Parts", In Proc. CHI 2015, ACM Press Apr. 18-23, 2015, 3011-3014.

Hong et al., "SplitBoard : A Simple Split Soft Keyboard for Wristwatch-sized Touch Screens" In Proc. CHI 2015, ACM Press Apr. 18-23, 2015, pp. 1233-1236.

Kerber et al., "WristRotate—A Personalized Motion Gesture Delimiter for Wrist-Worn Devices" In Proc. ACM, MUM2015 Press Nov. 30-Dec. 2, 2015, 218-222.

Kim et al., "Digits: Freehand 3D Interactions Anywhere Using a Wrist-Worn Gloveless Sensor" In Proc. UIST 2012, ACM Press Oct. 7-10, 2012, 167-176.

Laput et al., "Skin Buttons: Cheap, Small, Low-Power and Clickable Fixed-Icon Laser Projectors" In Proc. UIST 2014, ACM Press Oct. 5-8, 2014, 389-394.

Laput et al., EM-Sense : Touch Recognition of Uninstrumented, Electrical and Electromechanical Objects, In Proc. ACM UIST 2015, Nov. 8-11, 157-166.

Loclair et al., "PinchWatch : A Wearable Device for One-Handed Microinteractions", In Proc. MobileHCI 2010, ACM Press Sep. 7-10, 2010, 4 pages.

Nandakumar et a.,"FingerIO: Using Active Sonar for Fine-Grained Finger Tracking" In Proc. CHI 2016, ACM Press May 7-12, 2016, 11 pages.

Oakley et al., "Interaction on the Edge: Offset Sensing for Small Devices" In Proc. CHI 2014, ACM Press (2014), 169-178.

Oney et al., ZoomBoard: A Diminutive Qwerty Soft Keyboard Using Iterative Zooming for Ultra-small Devices. In Proc. CHI 2013, ACM Press Apr. 27-May 2, 2013, 2799-2802.

Polacek, "NoseTapping: What else can you do with your nose?" In Proc. MUM 2013, ACM Press (2013), 1-9.

Rekimoto, "GestureWrist and GesturePad: unobtrusive wearable interaction devices" In Proc. ISWC 2001 IEEE (2001), pp. 21-27.

Sapnas et al., "Enabling always-available input with muscle-computer interfaces" In Proc. UIST 2009, ACM Press Oct. 4-7, 2009, pp. 167-176.

Saunders et al., "The Performance of Indirect Foot Pointing Using Discrete Taps and Kicks While Standing" In Proc. GI 2015, ACM Press, Jun. 3-5, 2015, pp. 265-272.

Schirra et al.,"It's kind of like an extra screen for my phone": Understanding Everyday Uses of Consumer Smart Watches. Ext. Abstracts CHI 2015, ACM Press (2015), 2151-2156.

Scott et al.,"Sensing foot gestures from the pocket" In Proc. UIST2010, ACM Press Oct. 3-6, 2010, 199-208.

Vardy et al., The WristCam as input device. In Proc. ISWC 1999, IEEE (1999), 199-202.

Velloso et al. "The Feet in Human-Computer Interaction: A Survey of Foot-Based Interaction" ACM Computing Surveys, vol. 48, No. 2, Article 21, Sep. 2015, pp. 21:1-21:35.

Weiser, M., The Computer for the 21st Century. Scientific American, 265, No. 3 (1991), pp. 94-104.

Xia et al., "NanoStylus: Enhancing Input on Ultra-Small Displays with a Finger-Mounted Stylus", In Proc. UIST 2015, ACM Press Nov. 8-11, 2015, pp. 447-456.

(56) References Cited

OTHER PUBLICATIONS

Xiao et al., "Expanding the Input Expressivity of Smartwatches with Mechanical Pan, Twist, Tilt and Click" In Proc. CHI 2014, ACM Press Apr. 26-May 1, 2014, 193-196.

Xu et al. "Finger-writing with Smartwatch: A Case for Finger and Hand Gesture Recognition Using Smartwatch" In Proc. HotMobile 2015 Feb. 12-13, 2015, pp. 9-14.

Yamada et al., "Immediately-available Input Method Using One-handed Motion in Arbitrary Postures", Procedia Computer Science. 39, (2014), pp. 51-58.

Zarek et al., "One-Handed use of Capacitive Touch Devices", In Proc. AVI 2012, ACM Press May 21-25, 2012, 140 pages.

Zhang et al., "Tomo: Wearable, Low-Cost, Electrical Impedance Tomography for Hand Gesture Recognition" In Proc. UIST 2015, ACM Press Nov. 8-11, 2015, pp. 167-173.

"City Car Driving: Car Driving Simulator, PC Game". Citycardriving.com, at https://citycardriving.com. Snapshot dated Jul. 19, 2016 retrieved Mar. 14, 2020 from https://web.archive.org/web/20160719031019/https://citycardriving.com/, 2 pages.

"Myo Gesture Control Armband". Thalmic Labs Inc., at https://web.archive.org/web/20160529205409/https7/www.myo.com/, snapshot dated May 29, 2016, 5 pages.

"Nike+ Basketball". Nike, Inc., at https://web.archive.org/web/20140929035745/secure-nikeplus.nike.com/plus/products/basketball/, snapshot dated Sep. 29, 2014, 7 pages.

Bieber et al., "Ambient Interaction by Smart Watches", In Proc. PETRA2012, ACM Press, Jun. 6-8, 2012, 6 pages.

Chen, W. H., "Blowatch: Blowable and Hands-free Interaction for Smartwatches", Extended Abstracts, CHI 2015, ACM Press Apr. 18-23, 2015, pp. 103-108.

Hansen et al., "A gaze Interactive Textual Smartwatch Interface", Adjunct Proc. UbiComp/ISWC 2015, ACM Press Sep. 7-11, 2015, pp. 839-847.

Ogata et al., "SkinWatch: Skin Gesture Interaction for Smart Watch", In Proc. AH 2015, ACM Press Mar. 9-11, 2015, pp. 21-24.

Pizza et al., "Smartwatch in vivo", In Proc. CHI 2016, ACM Press May 7-12, 2016, pp. 14 pages.

\* cited by examiner

NO-HANDED SMARTWATCH INTERACTION TECHNIQUES

CROSS-REFERENCE TO RELATED APPLICATIONS

This application claims the benefit of United States provisional patent application titled "No-Handed Smartwatch Interaction Techniques," filed on Jul. 20, 2016 and having Ser. No. 62/364,809. The subject matter of this related application is hereby incorporated herein by reference.

BACKGROUND OF THE INVENTION

Field of the Invention

Embodiments of the present invention relate generally to wearable computers and, more specifically, to no-handed smartwatch interaction techniques.

Description of the Related Art

A "smartwatch" is a type of mobile computing device designed to be worn on the wrist of an end-user. Conventional smartwatches typically include a touchscreen interface allowing the end-user to input various touch gestures. Those touch gestures could include, for example, a "tap" gesture, a "swipe" gesture, or a "pinch" gesture, among other gestures commonly associated with touchscreen interfaces. In response to touch gestures, the smartwatch performs various operations, including playing music, opening emails, placing phone calls, and so forth. To perform a given touch gesture, the end-user first positions the wrist bearing the smartwatch to make the touchscreen interface visible to the end-user. The end-user then inputs the touch gesture to the touchscreen interface using his/her other hand.

The above approach for interacting with smartwatches is problematic under circumstances where the end-user has limited arm, hand, or finger mobility that prevents the user from directly touching the touchscreen. For example, when performing a task that requires both hands, such as cooking or driving, the end-user is physically unable to physically interact with the smartwatch to input touch gestures in the manner described above. In another example, when engaging in social interactions requiring the full attention of the end-user, such as participating in a conversation with one or more other people, the end-user cannot interact with a smartwatch in the manner described above without violating social taboos and coming across as rude. As a general matter, a wide variety of scenarios can occur where an end-user is restricted from inputting touch gestures to a smartwatch in conventional ways.

As the foregoing illustrates, what is needed in the art are techniques for interacting with a smartwatch without requiring direct interaction with the touchscreen interface.

SUMMARY OF THE INVENTION

Various embodiments of the present invention set forth a computer-implemented method for interacting with a wearable computing device, including processing a first data stream to determine that a first criterion has been met, determining that the first criterion corresponds to a first no-handed input not involving either hand of an end-user, and mapping the first no-handed input to a first command for execution by the wearable computing device.

At least one advantage of the techniques described herein is that the end-user can initiate a multitude of smartwatch operations without using either hand. Accordingly, in situations where the end-user is restricted from using one or both hands to input touch gestures to the smartwatch, the end-user may still interact with the smartwatch.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

As discussed above, many situations may occur where an end-user of a smartwatch cannot input touch gestures to the smartwatch due to various types of constraints. These constraints could be physical constraints that prevent the end-user from using either hand, or social constraints that prevent the end-user from diverting attention to the smartwatch, among other possibilities.

To address such situations, embodiments of the invention include a smartwatch configured with a suite of sensors capable of detecting a range of no-handed inputs. In the context of this disclosure, a "no-handed" input includes any input to the smartwatch that does not require the end-user to perform a specific action with either hand or any fingers. Based on these no-handed inputs, the smartwatch may initiate any technically feasible operation. One advantage of the techniques described herein is that the end-user is able to interact with the smartwatch during times when conventional approaches would disallow smartwatch interaction.

System Overview

Figure 1:
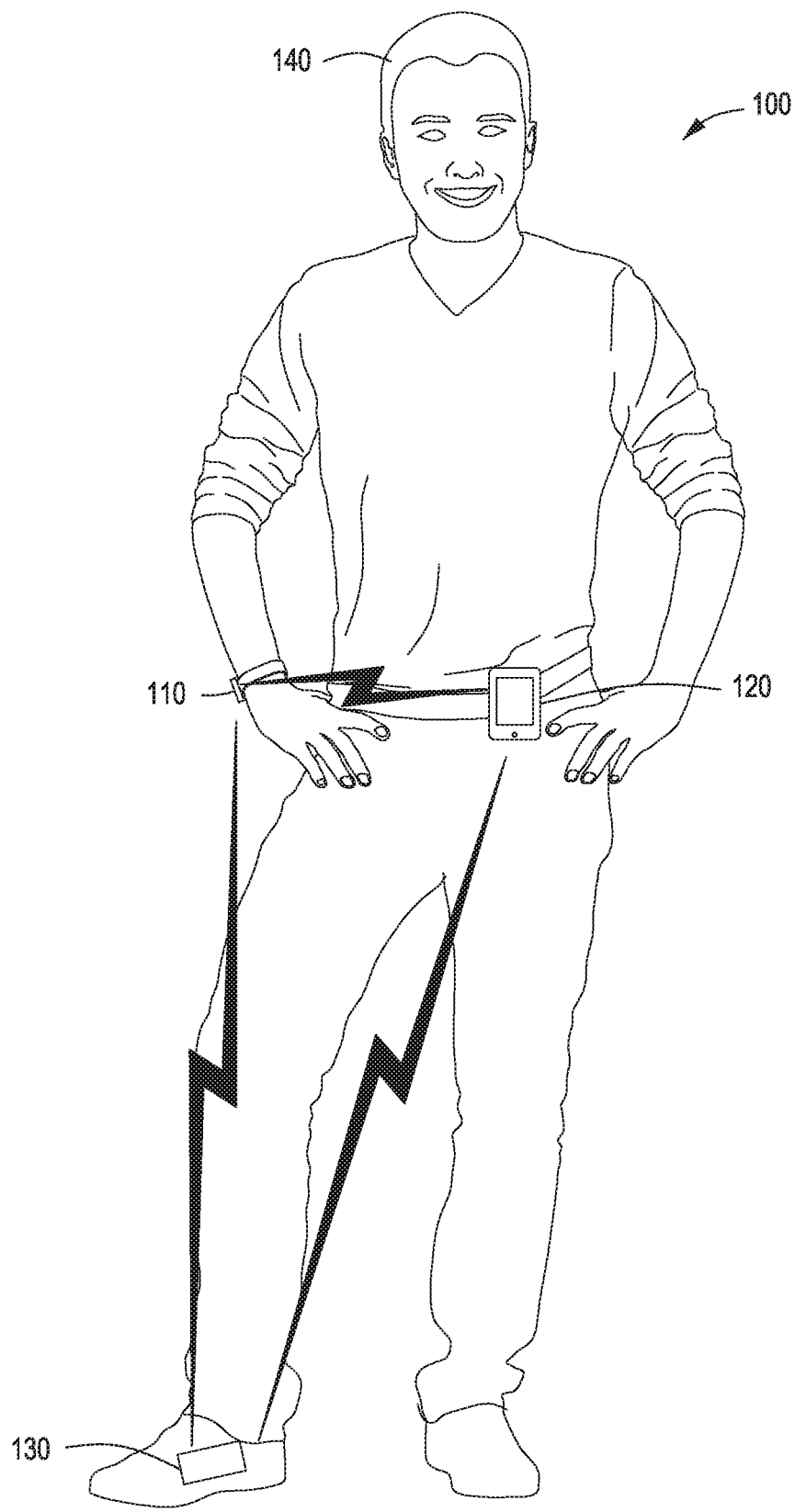
FIG. 1 illustrates a system configured to implement one or more aspects of the present invention.

FIG. 1 illustrates a system configured to implement one or more aspects of the present invention. As shown, a system 100 includes a smartwatch 110, a mobile device 120, and a pedometry device 130 that are coupled together wirelessly. The elements of system 100 are computing devices worn or carried by an end-user 140. Smartwatch 110 is a small computer designed to be worn on the wrist of end-user 140. Mobile device 120 is a smartphone, tablet computer, or other mobile computing device that can be carried by end-user 140 or placed into the pocket of end-user 140. Pedometry device 130 is a motion tracking device coupled to (or integrated into) the shoe of end-user 140 and configured to monitor walking and/or running movement and potentially other, more complex types of foot dynamics.

Smartwatch 110, mobile device 120, and pedometry device 130 are configured to interoperate with one another in order to detect and respond to no-handed inputs provided by end-user 140. To that end, each of smartwatch, 110, mobile device 120, and pedometry device 130 includes a wireless transceiver (not shown) for communicating with one another. For example, smartwatch 110, mobile device 120, and pedometry device 130 could communicate via the Bluetooth™ protocol. Each of smartwatch 110, mobile device 120, and pedometry device 130 also includes a sensor suite (not shown) for generating inertial, acoustic, and/or optical measurements that may represent no-handed inputs. Mobile device 120 and pedometry device 130 may transmit these measurements to smartwatch 110 for processing. Smartwatch 110, mobile device 120, and pedometry device 130 are described in greater detail below in conjunction with FIGS. 2A, 2B, and 2C, respectively.

Figure 2A:
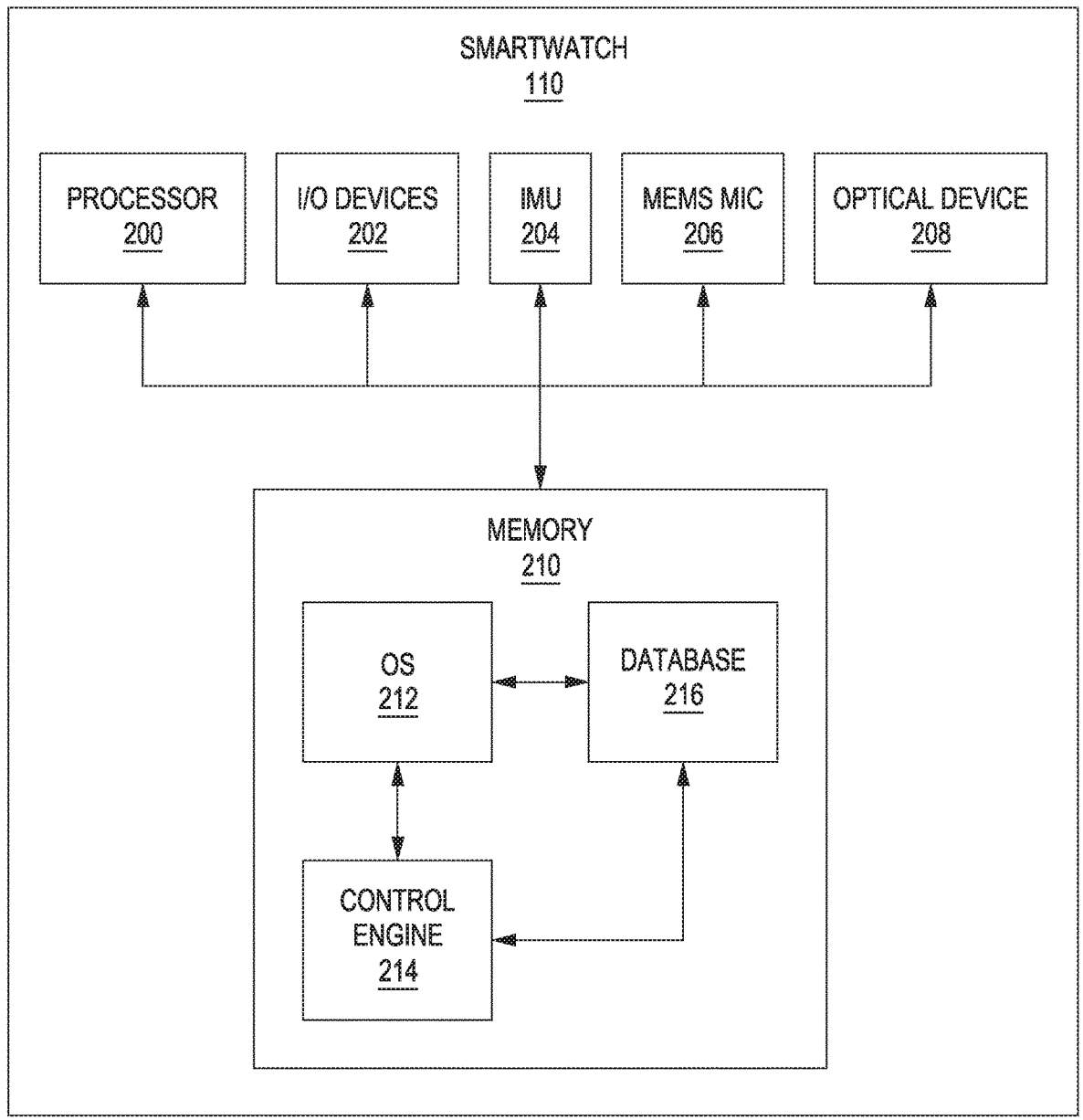
FIG. 2A is a more detailed illustration of the smartwatch of FIG. 1, according to various embodiments of the present invention.

FIG. 2A is a more detailed illustration of the smartwatch of FIG. 1, according to various embodiments of the present invention. As shown, smartwatch 110 includes a processor 200, input/output (I/O) devices 202, an inertial measurement unit (IMU) 204, a microelectromechanical system (MEMS) microphone (mic) 206, an optical device 208, and a memory 210.

Processor 200 may be any technically feasible form of processing device configured to process data and execute program code. Processor 200 could be, for example, a central processing unit (CPU), a graphics processing unit (GPU), an application-specific integrated circuit (ASIC), a field-programmable gate array (FPGA), any technically feasible combination of such units, and so forth.

I/O devices 202 may include devices configured to receive input, including, for example, a keyboard, a mouse, and so forth. I/O devices 202 may also include devices configured to provide output, including, for example, a display device or a speaker, among others. I/O devices 202 may further include devices configured to both receive and transmit input and output, respectively, including, for example, a touchscreen, a universal serial bus (USB) port, and so forth.

IMU 204 includes one or more accelerometers and/or one or more gyroscopes. IMU 204 is configured to record inertial measurements representing the translation and/or rotation of smartwatch 110. In one embodiment, IMU 204 is a 9 degree of freedom (DoF) instrument. MEMS mic 206 is an audio input device configured to measure acoustic waves. Multiple MEMS mics 206 may be included in smartwatch 110. Other types of audio inputs may be implemented in place of MEMS mic 206, as well. Optical device 208 includes a light sensor configured to measure light intensity and/or color values across a range of locations. Optical device 208 may also include an optical output that illuminates a surface. In one embodiment, optical device 208 is an optical mouse configured to detect motion relative to a surface.

Memory 210 may include any technically feasible storage medium configured to store data and software applications. Memory 210 could be, for example, a hard disk, a random access memory (RAM) module, a read-only memory (ROM), and so forth. Memory 210 includes an operating system (OS) 212, a control engine 214, and a database 216. OS 212 is a software application that, when executed by processor 200, coordinates some or all smartwatch operations. OS 212 interoperates with control engine 214. Control engine 214 is a software application that, when executed by processor 200, provides control over smartwatch 110 in response to no-handed inputs. Based on sensor data representing those no-handed inputs, control engine 212 generates commands to initiate various smartwatch operations. Control engine 214 may be a standalone application or a software module included within OS 212. Control engine 214 is described in greater detail below in conjunction with FIG. 3. Database 216 is a software application that, when executed by processor 200, manages storage and retrieval of data on behalf of OS 212 and control engine 214.

Figure 2B:
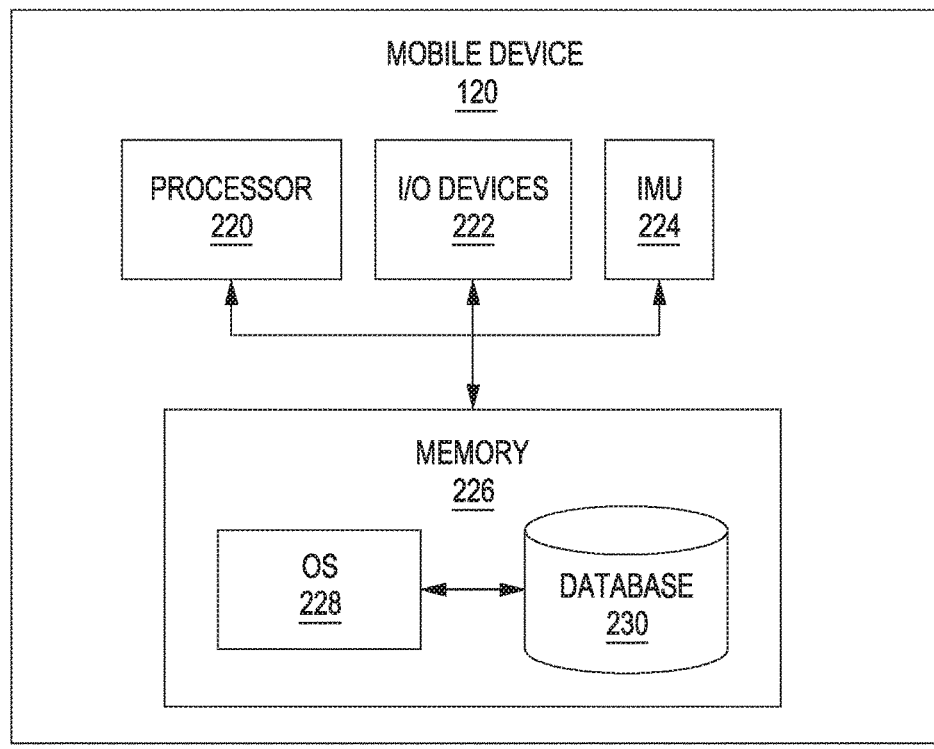
FIG. 2B is a more detailed illustration of the mobile device of FIG. 1, according to various embodiments of the present invention.

FIG. 2B is a more detailed illustration of the mobile device of FIG. 1, according to various embodiments of the present invention. As shown, mobile device 120 includes a processor 220, I/O devices 222, IMU 224, and memory 226. Memory 224 includes OS 228 and database 230. Processor 220, I/O devices 222, IMU 224, and memory 226 may be substantially similar in function to like units described above in conjunction with FIG. 2A. OS 228 is a software application that, when executed by processor 220, performs generic computations as well as coordinates telephonic communications.

Figure 2C:
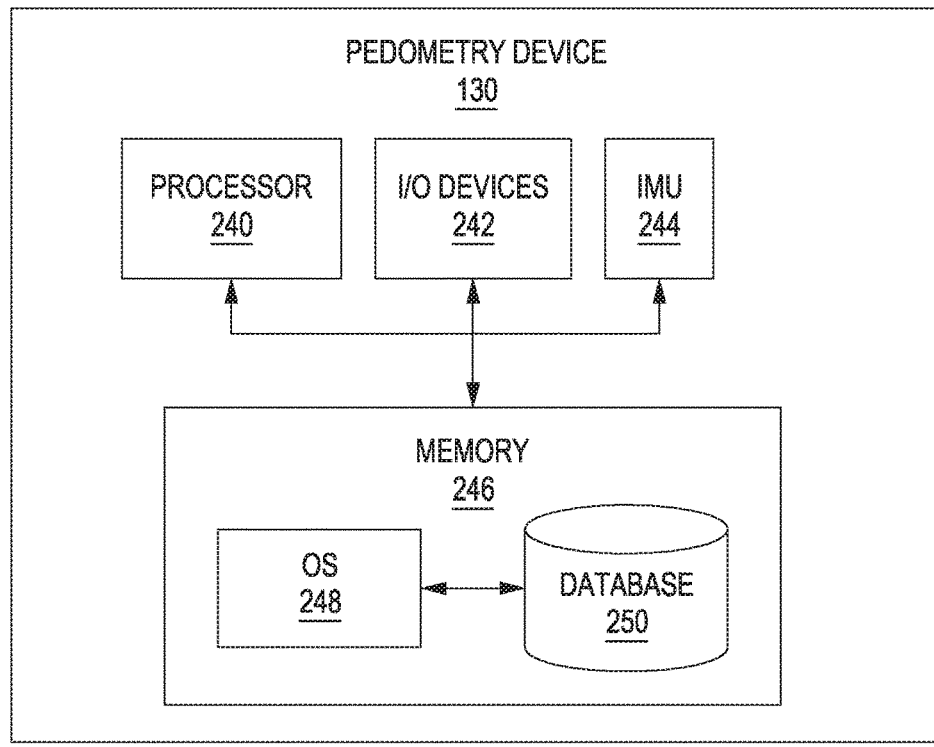
FIG. 2C is a more detailed illustration of the pedometry device of FIG. 1, according to various embodiments of the present invention.

FIG. 2C is a more detailed illustration of the pedometry device of FIG. 1, according to various embodiments of the present invention. As shown, pedometry device 130 includes a processor 240, I/O devices 242, IMU 244, and memory 246. Memory 246 includes OS 248 and database 250. Processor 240, I/O devices 242, IMU 244, and memory 246 may be substantially similar in function to like units described above in conjunction with FIGS. 2A-2B. OS 248 is a software application that, when executed by processor 240, performs computation involved with pedometry.

Figure 3:
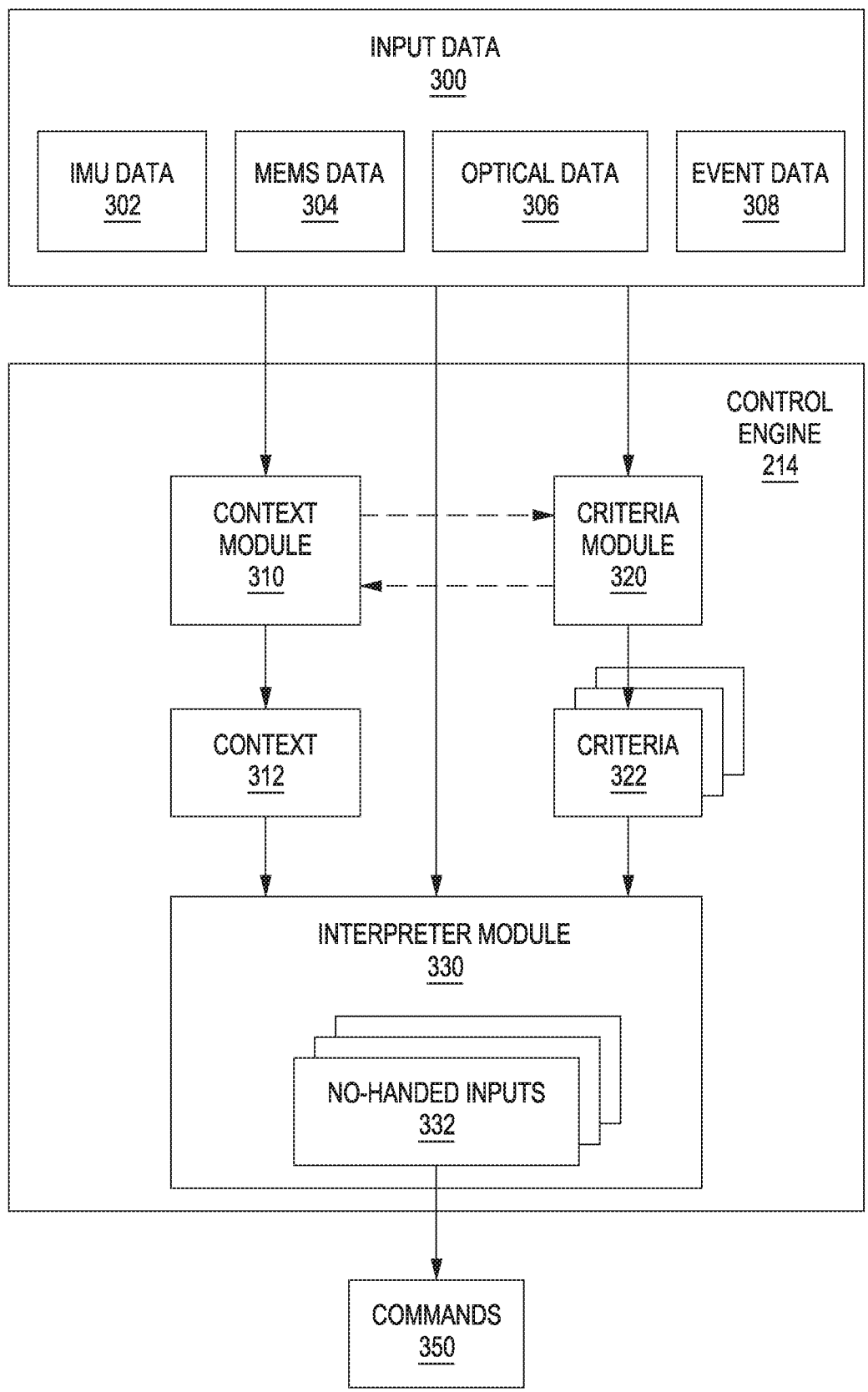
FIG. 3 is a more detailed illustration of the control engine of FIG. 2, according to various embodiments of the present invention.

FIG. 3 is a more detailed illustration of the control engine of FIG. 2, according to various embodiments of the present invention. As shown, control engine 214 includes context module 310, criteria module 320, and interpreter module 330, each of which is configured to receive and process input data 300. Based on input data 300, context module 310 generates and/or updates context 312, and criteria module 320 generates and/or updates one or more criteria 322. Based on context 312, input data 300, and criteria 322, interpreter module 330 identifies a specific no-handed input 332 performed by the end-user 140 and then translates this input into one or more commands 350. OS 212 executes commands 350 via processor 200 to cause smartwatch 110 to perform corresponding smartwatch operations.

Input data 300 includes IMU data 302, MEMS data 304, optical data 306, and event data 308. IMU data 302 includes one or more data streams generated by IMU 204, such as timestamped translation or rotation values. MEMS data 304 includes one of more data streams generated by MEMS mic 206, such as timestamped acoustic amplitude values. Optical data 306 includes one or more data streams generated by optical device 208, such as timestamped light intensity and/or color values. Event data 308 includes notifications generated by OS 212 when various system-level events occur. Those events could include, for example, detection of an incoming phone call, arrival of an email, determination that a connection is established with mobile device 120 and/or pedometry device 130, or receipt of inertial data from mobile device 120 and/or pedometry device 130, among other types of events.

Context module 310 processes the various types of data included within input data 300 and then generates and/or updates context 312. Context 312 represents the current state of smartwatch 110 and/or end-user 140. For example, context 312 could indicate that smartwatch 110 is currently executing an email program, thereby indicating that end-user 140 is checking or writing email. Or, context 312 could indicate that pedometry device 130 detects sequential footfalls, thereby indicating that end-user 140 is walking. Continuing this example, context 312 could also indicate that smartwatch 110 is not swinging in a coordinated manner with those sequential footfalls (as would be expected with a regular walking gait), thereby indicating that end-user 140 is walking and carrying an object. As a general matter, context 312 reflects the real-world state of being and current behavior of smartwatch 110 and/or end-user 140.

In one embodiment, context module 310 implements a finite state machine (FSM) configured to map input data 300 to one or more states. Each state in the FSM may represent a specific real-world state of being associated with smartwatch 110, end-user 140, and/or the overarching physical environment. Context module could include the current state of the FSM in context data 312. In another embodiment, context module 310 executes an artificial neural network or machine learning algorithm to map input data 300 to one or more categories of activity associated with smartwatch 110 and/or end-user 140. Context module could include selections of these categories into context data 312.

Criteria module 320 processes the various types of data included within input data 300 and then generates and/or updates criteria 322 to represent specific criteria for detecting no-handed inputs. A given criterion 322 generally takes the form of a condition that, when satisfied based on input data 300, indicates that a corresponding no-handed input has occurred. For example, a first criterion 322 could state that a first no-handed input occurs when the linear acceleration of smartwatch 110 exceeds a threshold value within a particular time window. In another example, a second criterion 322 could state that a second no-handed input occurs when both smartwatch 110 and mobile device 120 accelerate upwards and then downwards one or more times within a given time window. Criteria 322 may be preprogrammed into control engine 212, or criteria 322 may be generated and/or updated on the fly based on real-time data gathered by the various elements of system 100.

In one embodiment, criteria module 320 interoperates with context module 310 to generate and/or update criteria 322. In doing so, criteria module 320 analyzes context 312 to adjust various parameters associated with each criterion 322, including time window sizes, thresholds, and other numerical parameters used to analyze input data 300. For example, if context 312 indicates that end-user 140 is currently running, then criteria module 320 could increase a linear acceleration threshold beyond which a given no-handed input is detected to accommodate this increase in motion.

Interpreter module 330 collects context 312, input data 300, and criteria 322 and then identifies a specific no-handed input 332 potentially performed by end-user 140. In one embodiment, interpreter module 330 applies criteria 322 to input data 300 to determine if any of criteria 322 are met. If a given criterion 322 is met, then interpreter module 330 identifies the particular no-handed input 322 corresponding to that criteria 322, and then generates a specific command 350 associated with that no-handed input.

In another embodiment, prior to identifying a specific no-handed input 322, interpreter module 330 first narrows the set of possible no-handed inputs 332 based on context 312. For example, if context 312 indicates that end-user 140 is currently having a phone conversation, then interpreter module 330 could suppress a given no-handed input 332 corresponding to sending an email because that operation is unlikely to be needed by end-user 140.

In yet another embodiment, interpreter module 330 may map specific no-handed inputs 332 to different commands 350 depending on context 312. For example, if context 312 indicates that the end-user 140 is currently carrying an object, then interpreter module 330 could map a first no-handed input 332 to a command 350 for sending an incoming phone call to voicemail. However, if context 312 indicates that the end-user 140 is currently driving, then interpreter module 330 could instead map the first no-handed input 332 to answering an incoming phone call.

In various embodiments, control engine 214 operates in a "continuous" mode of operation whereby interpreter module 330 processes input data continuously and in real-time to identify no-handed inputs to be mapped to commands 350. In other embodiments, control engine 214 operates in a "delimiter" mode of operation whereby interpreter module 330 waits for one or more specific "delimiter" events to occur before performing the processing discussed above. The delimiter event could be a discrete system event included in event data 308, or a specific no-handed input, either of which trigger control engine 214 to begin processing input data 300 to generate commands 350.

As discussed, once interpreter module 330 generates commands 350, OS 212 may execute those commands in order to initiate specific operations of smartwatch 110. In this manner, end-user 140 is capable of interacting with smartwatch 110 even when both hands of end-user 140 are occupied. FIGS. 4-9 illustrate specific examples of no-handed inputs that can be detected by smartwatch 110.

Exemplary No-Handed Inputs

Figure 4:
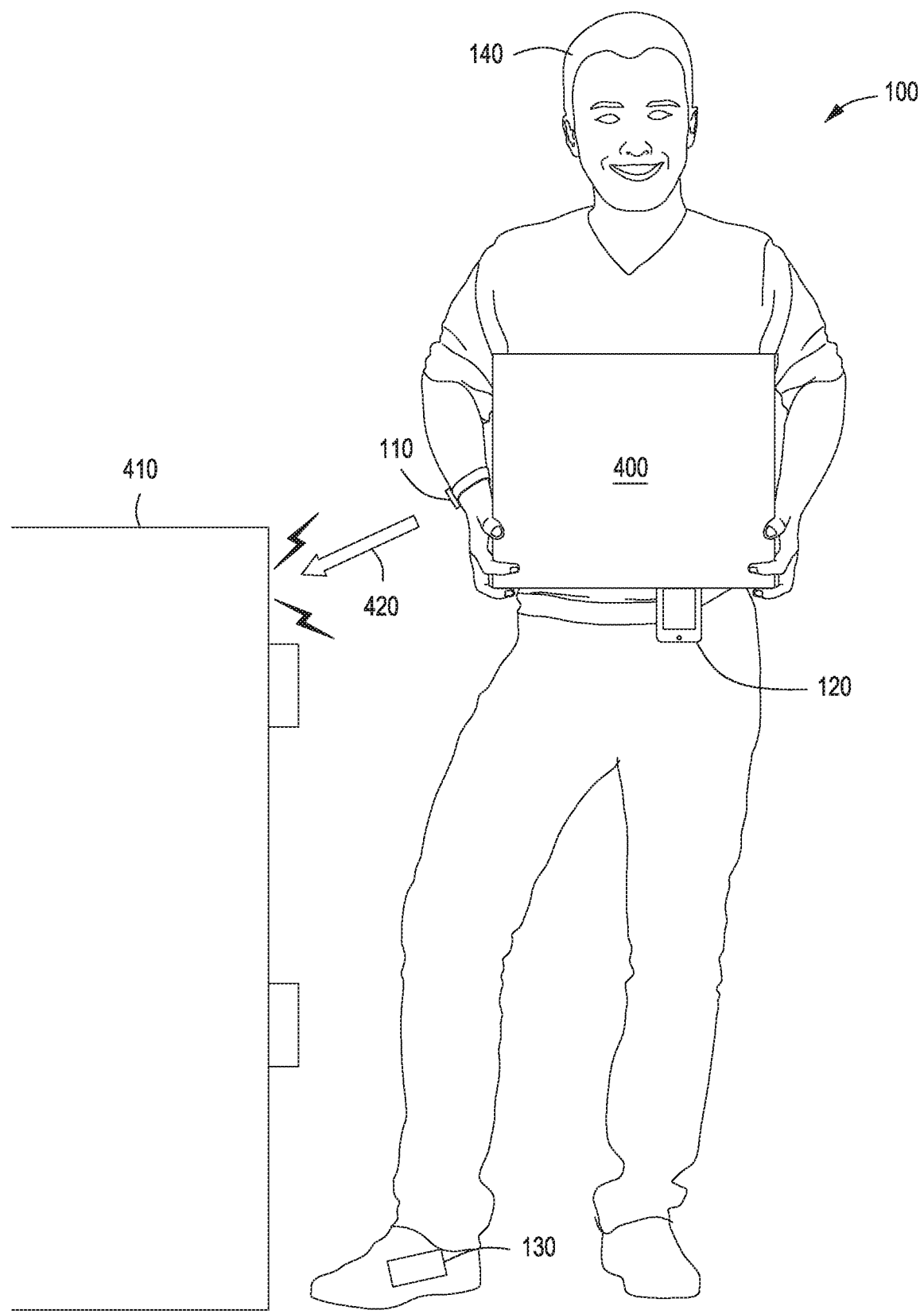
FIG. 4 is an exemplary depiction of how the smartwatch of FIG. 1 detects a no-handed input imparted by bumping into an object, according to various embodiments of the present invention.

FIG. 4 is an exemplary depiction of how the smartwatch of FIG. 1 detects a no-handed input when bumping into an object, according to various embodiments of the present invention. As shown, end-user 140 carries object 400 and therefore both hands of end-user 140 are occupied. To interact with smartwatch 110 despite these constraints, end-user 140 causes smartwatch 110 to impact an object 410 via trajectory 420. This type of no-handed input may be referred to as a "bang" no-handed input.

To detect a "bang" no-handed input, control engine 214 monitors IMU data 302 and determines when the linear acceleration of smartwatch 110 exceeds a specific acceleration threshold within a time window. Typically these conditions are met when smartwatch 110 impacts an object, although control engine 214 may also detect a "bang" no-handed impact without actual physical contact (thereby preventing potential damage to smartwatch 110). The acceleration threshold and time window may be included in criteria 322. In one embodiment, the acceleration threshold is 9.5 gravitational units (Gs), and the time window is 200 milliseconds (ms). In another embodiment, control engine 214 modifies these particular values based on context 312.

Figure 5:
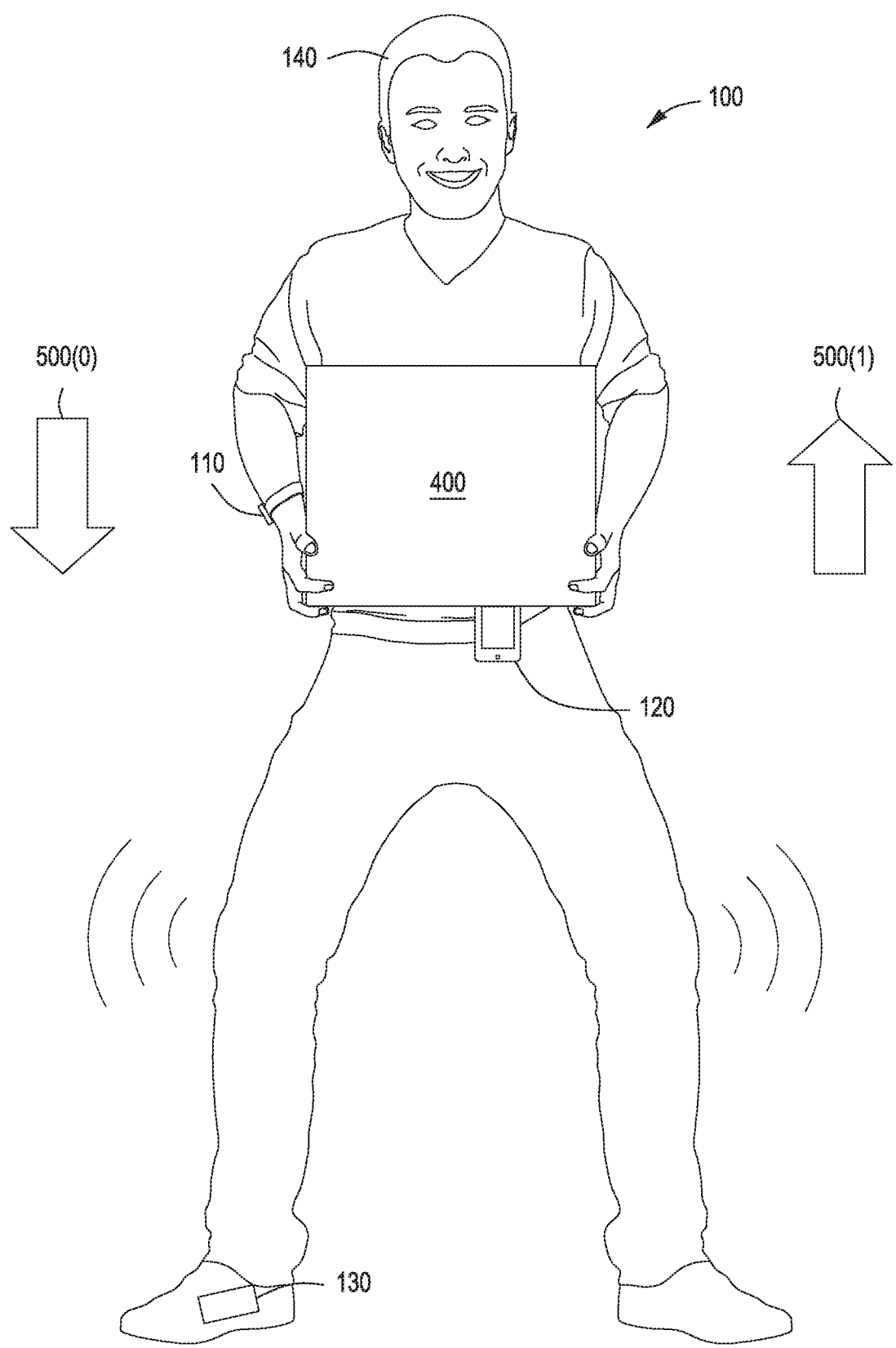
FIG. 5 is an exemplary depiction of how the smartwatch of FIG. 1 detects a no-handed input imparted by one or more body movements of the end-user, according to various embodiments of the present invention.

FIG. 5 is an exemplary depiction of how the smartwatch of FIG. 1 detects a no-handed input based on body movements of the end-user, according to various embodiments of the present invention. As shown, end-user 140 again carries object 400 with both hands. To perform another no-handed input despite these constraints, end-user 140 performs a "body bounce" no-handed input by crouching slightly along trajectory 500(0) and then straightening along trajectory 500(1). End-user 140 may bend at the knee, waist, back, and so forth to implement the body bounce no-handed input.

To detect this particular no-handed input, control engine 214 monitors IMU data 202 to identify, within a given time window, a sharp downward acceleration exceeding a first threshold followed by a sharp upward acceleration exceeding a second threshold. Control engine 214 also monitors acceleration data provided by mobile device 120 similarly to identify, within another time window, a sharp downward acceleration exceeding a third threshold followed by a sharp upward acceleration exceeding a fourth threshold. When IMU data 202 and acceleration data provided by mobile device 120 both follow this downward/upward pattern of acceleration, control engine 214 identifies that a body bounce no-handed input has occurred. The various time windows and thresholds discussed above may be included in criteria 322. In one embodiment, the time windows discussed above may be 330 ms in length. In another embodiment, control engine 214 may detect different body bounce no-handed inputs based on the number of upward and downward peaks detected. In yet another embodiment, control engine 214 modifies the thresholds, time windows, or number of peaks needed for detection based on context 312.

Figure 6:
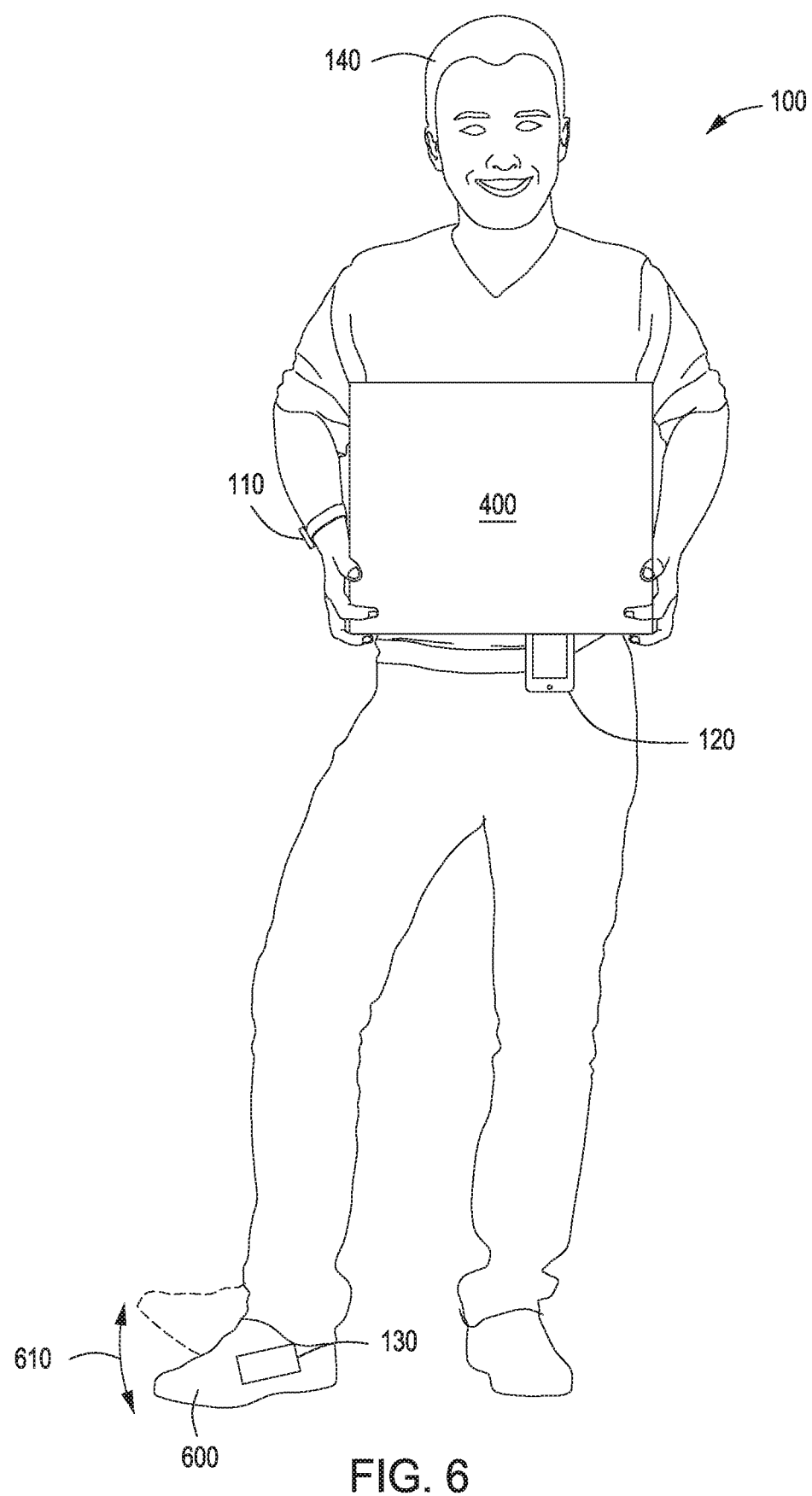
FIG. 6 is an exemplary depiction of how the smartwatch of FIG. 1 detects a no-handed input imparted by one or more foot movements of the end-user, according to various embodiments of the present invention.

FIG. 6 is an exemplary depiction of how the smartwatch of FIG. 1 detects a no-handed input based on foot movements of the end-user, according to various embodiments of the present invention. As shown, the hands of end-user 140 are physical constrained due to object 400. However, end-user 140 can interact with smartwatch 110 by tapping foot 600 along trajectory 610. This type of no-handed input is referred to as a "foot tap" no-handed input.

To detect a foot tap no-handed input, control engine 214 communicates with pedometry device 130 to gather data representing the motion of foot 600. This data may include raw inertial data or post-processed metadata. Control engine 214 processes the received data to determine the number, frequency, and/or amplitude of foot taps that occur within a time window. Control engine 214 may also analyze the received data to determine a directionality associated with each foot tap. For example, end-user 140 could tap the right side of foot 600 versus the left side of foot 600. Criteria 322 may include various parameters for identifying foot taps, including minimum number of taps within a threshold time window, threshold tapping amplitudes, and so forth. In one embodiment, control engine 214 detects a "side foot tap" when end-user 140 lifts foot 600, taps to one side, and then returns foot 600 to the original position within 1.5 seconds. In another embodiment, control engine 214 detects a "double foot tap" when end-user 140 performs two consecutive foot taps within a 500 ms time window. In yet another embodiment, control engine 214 modifies the various thresholds, time windows, and other parameters associated with the foot tap no-handed input based on context 312.

Figure 7:
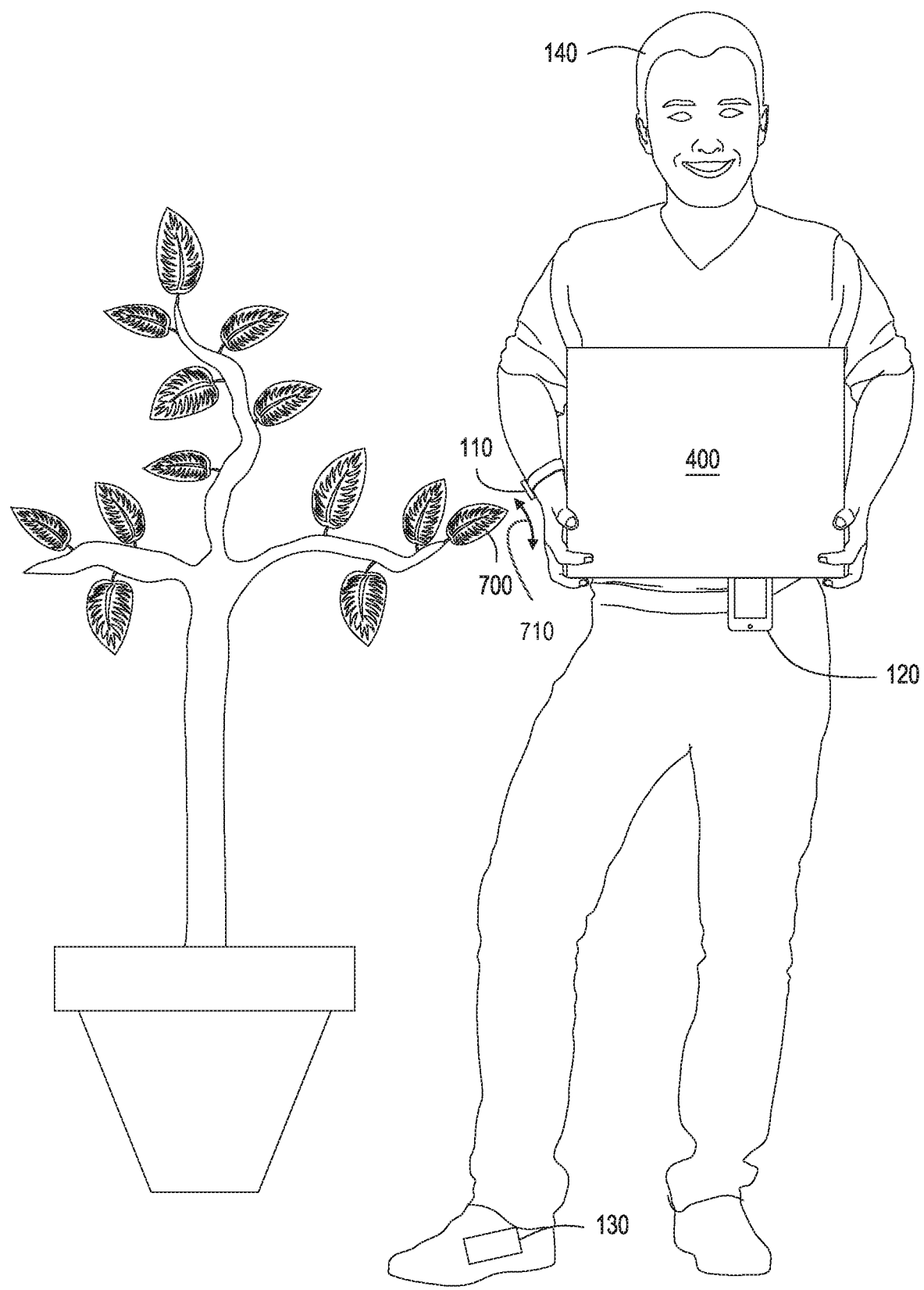
FIG. 7 is an exemplary depiction of how the smartwatch of FIG. 1 detects a no-handed input received from an external object, according to various embodiments of the present invention.

FIG. 7 is an exemplary depiction of how the smartwatch of FIG. 1 detects a no-handed input received from an external object, according to various embodiments of the present invention. As shown, end-user 140 carries object 400 and cannot directly manipulate smartwatch 110 or interact with a touchscreen of smartwatch 110. However, end-user 140 may rely on an external object to perform a no-handed touchscreen input. The external object may be a leaf 700 of a plant, as is shown, or any other object capable of inducing a capacitive touch (CT) response on a touchscreen. To perform the no-handed smartwatch input, the end-user 140 moves along trajectory 710. In one embodiment, the external object is an object dedicated to performing touchscreen inputs, such as a model of the hand of end-user 140 that is coated with a material designed to register on touchscreens.

To detect a no-handed touchscreen input, end-user 140 simply positions the touchscreen of smartwatch 110 such that the external object inputs touch gestures to the touchscreen. In one embodiment, control engine 214 may detect CT values that differ between ordinary touchscreen inputs received via the fingers of end-user 140 and no-handed touchscreen inputs received via external objects. These differences allow control engine 214 to distinguish between different objects inputting touchscreen gestures. In response, control engine 214 may generate different sets of commands 350 for execution depending on whether the touchscreen inputs are generated directly by end-user 140 or indirectly via an external object. CT values associated with different touchscreen objects may be included in criteria 312. In various embodiments, control engine 214 modifies these CT values based on context 312.

Figure 8:
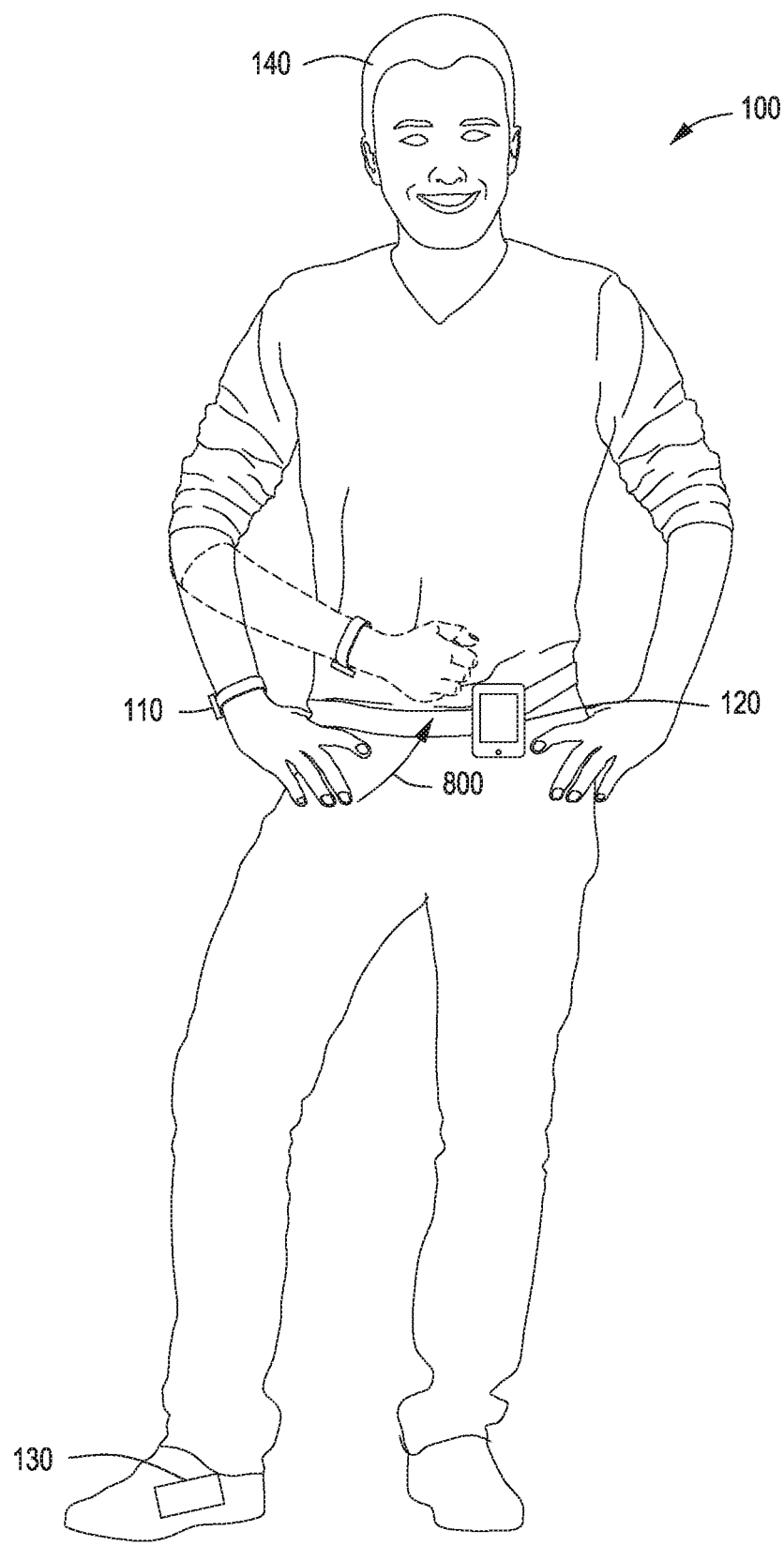
FIG. 8 is an exemplary depiction of how the smartwatch of FIG. 1 detects a no-handed input imparted by swiping across the body of the end-user, according to various embodiments of the present invention.

FIG. 8 is an exemplary depiction of how the smartwatch of FIG. 1 detects a no-handed input when swiping across the body of the end-user, according to various embodiments of the present invention. As shown, end-user 140 is not encumbered by an object but nonetheless may desire to perform a no-handed input. To do so, end-user 140 swipes smartwatch along trajectory 800 and across a surface, such as the body of end-user 140. This type of no-handed input may be referred to as a "swipe" no-handed input.

Control engine 214 detects swipe no-handed inputs by processing optical device data 306 and determining that optical device 208 detects a threshold level of translational movement relative to a surface. Control engine 214 then maps the swipe no-handed input to a specific command 350. Control engine 214 may also extract magnitude and directionality values associated with the translational movement and provide those values as arguments to the specific command 350. Accordingly, end-user 140 may have granular control over the operation performed by smartwatch 110 in response to the command. For example, if the swipe no-handed input turns pages in a book, then the translational movement magnitude could indicate the number of pages to turn within a time window, and the translational movement directionality could indicate whether the pages should be turned forwards or backwards. IU The various parameters associated with the swipe no-handed input may be included within criteria 322 and, in some embodiments, those values may be updated based on context 312.

Figure 9:
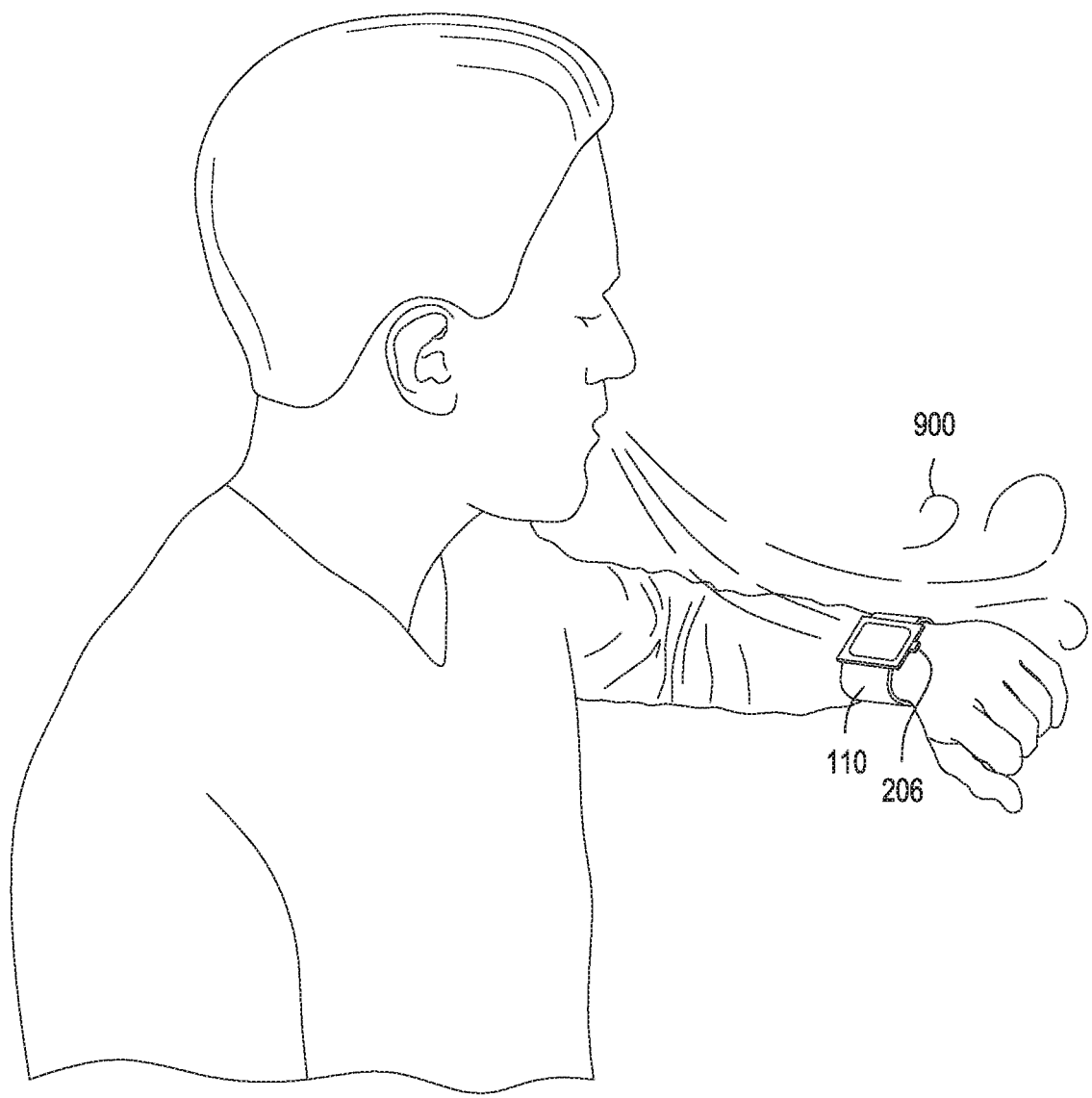
FIG. 9 is an exemplary depiction of how the smartwatch of FIG. 1 detects a no-handed input imparted by the end-user blowing against the smartwatch, according to various embodiments of the present invention.

FIG. 9 is an exemplary depiction of how the smartwatch of FIG. 1 detects a no-handed input when blown upon by the end-user, according to various embodiments of the present invention. As shown, end-user 140 blows a stream 900 of air across smartwatch 110 to perform a "blow" no-handed input.

To detect a blow no-handed input, control engine 214 processes MEMS data 204 received from MEMS mic 206 and determines that the timestamped amplitude values included in that MEMS data exceed a threshold amplitude value over a specific time window. Control engine 214 may also identify that those amplitude values occur with a particular characteristic frequency. Based on analyzing MEMS data 204, control engine 214 determines that end-user 140 is blowing on smartwatch 110. The various numerical parameters associated with detection of the blow no-handed input reside in criteria 322 and, in some embodiments, control engine 214 modifies those values based on context 312.

Referring generally to FIGS. 4-9, persons skilled in the art will understand that the various no-handed inputs illustrated in those figures are provided for exemplary purposes only. In addition, the various detection criteria discussed are exemplary. Control engine 214 may also implement other criteria without departing from the essential scope and spirit of the invention. Control engine 214 may detect these no-handed inputs, and others, by processing data on a continuous basis, or upon entering a no-handed input mode triggered by a delimiter event, as discussed. In addition, control engine 214 may detect no-handed inputs in a context-aware manner and using criteria that varies according to context. The techniques discussed thus far are described in stepwise fashion below in conjunction with FIGS. 10-11.

Detecting No-Handed Inputs

Figure 10:
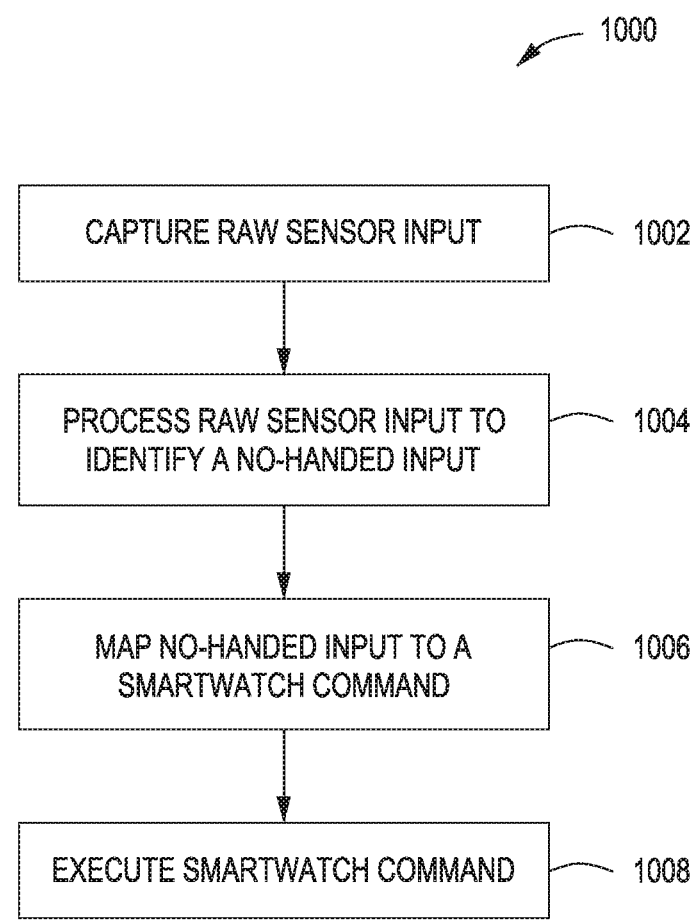
FIG. 10 is a flow diagram of method steps for mapping a no-handed input to a smartwatch command, according to various embodiments of the present invention.

FIG. 10 is a flow diagram of method steps for mapping no-handed inputs to smartwatch commands, according to various embodiments of the present invention. Although the method steps are described with respect to the systems of FIGS. 1-9, persons skilled in the art will understand that any system configured to perform the method steps, in any order, falls within the scope of the present disclosure.

As shown, a method 1000 begins at step 1002, where control engine 214 within smartwatch 110 captures raw sensor data from IMU 302, MEMS mic 304, and/or optical device 306. The captured data may be included in input data 300. At step 1004, control engine 214 processes the captured raw sensor data to identify a no-handed input. When processing sensor data, control engine 214 may determine whether one or more of criteria 322 is met. At step 1006, control engine 214 maps the identified no-handed input to a smartwatch command. The smartwatch command may be one or more commands 350. At step 1008, control engine 214 causes the command to be executed. Control engine 214 may transmit the command to OS 212 for execution on processor 200.

Control engine 214 implements the method 1000 to perform the essential operation of mapping no-handed inputs to commands. Control engine 214 may also perform a more complex set of operations for mapping no-handed inputs to commands, as described in greater detail below in conjunction with FIG. 11.

Figure 11:
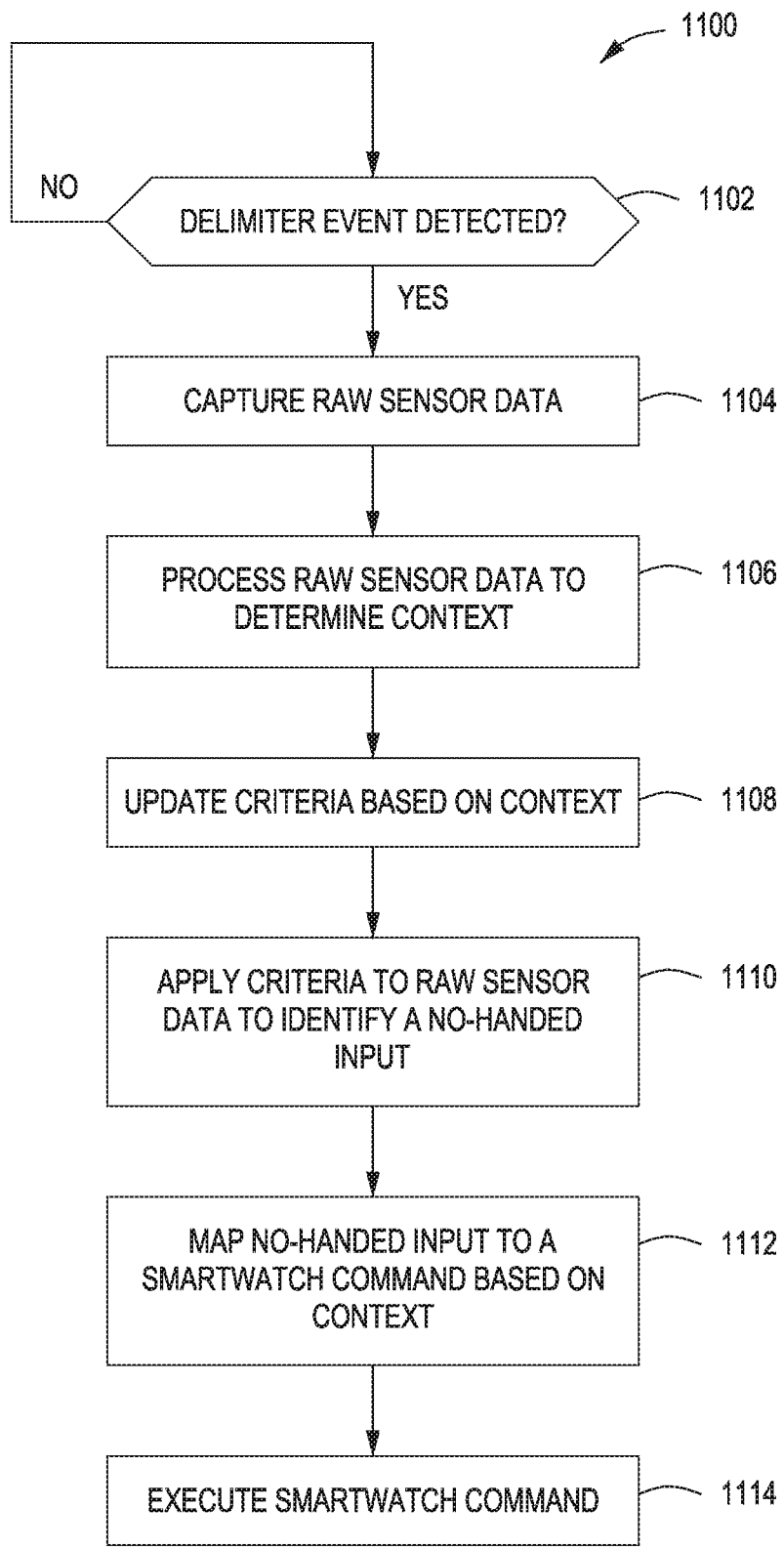
FIG. 11 is a flow diagram of method steps for executing smartwatch operations in response to no-handed inputs, according to various embodiments of the present invention.

FIG. 11 is a flow diagram of method steps for executing context-aware smartwatch operations in response to no-handed inputs, according to various embodiments of the present invention. Although the method steps are described with respect to the systems of FIGS. 1-9, persons skilled in the art will understand that any system configured to perform the method steps, in any order, falls within the scope of the present disclosure.

As shown, a method 1100 begins at step 1102, where control engine 214 processes input data 300 to detect a delimiter event. A delimiter event could be any detectable event, including a system-level notification or a specific no-handed input. Control engine 214 repeats step 1102 until a delimiter event is detected, then proceeds to step 1104.

At step 1104, control engine 214 captures raw sensor data. The raw sensor data is generally included in input data 300 and may be derived from IMU 204, MEMS mic 206, and/or optical device 208. At step 1106, control engine 214 processes the raw sensor data to determine a context 312 and/or one or more contextual constraints. A contextual constraint may be derived from a context 312. Accordingly, at step 1104, control engine 214 may generate a context 312, and then determine specific constraints associated with smartwatch 110 and/or end-user 140 related to that context. For example, if context 312 indicates that end-user 140 is currently running, then a contextual constraint could indicate that end-user 140 cannot read an email and, likewise, smartwatch 110 need not make email checking operations available.

At step 1108, control engine 214 updates criteria 322 based on the context 312 and/or contextual constraints determined at step 1106. To update criteria 322, control engine 214 may adjust various parameters including thresholds, time windows, and other numerical values control engine 214 uses to identify no-handed inputs. At step 1110, control engine 214 applies criteria 322 to the raw sensor data to identify a no-handed input. At step 1112, control engine 214 maps the no-handed input to a command 350 based on context 312 and/or the associated contextual constraint. As previously mentioned, control engine 214 may suppress certain commands based on context 312. At step 1114, control engine 214 causes smartwatch 110 to execute the command.

In sum, via no-handed inputs to a smartwatch, an end-user can initiate various smartwatch operations when either or both hands of the end-user are occupied. The smartwatch includes a suite of sensors for capturing inertial, acoustic, and optical data. The smartwatch also interfaces with a handheld mobile computing device and/or a shoe-mounted pedometry device to capture additional sensor data. A control engine executing on the smartwatch processes captured sensor data and identifies no-handed inputs performed by the end-user. The control engine maps these no-handed inputs to specific commands that can be executed on the smartwatch to initiate smartwatch operations.

At least one advantage of the techniques described herein is that the end-user can initiate a multitude of smartwatch operations without using either hand. Accordingly, in situations where the end-user is restricted from using one or both hands to input touch gestures to the smartwatch, the end-user may still interact with the smartwatch.

The descriptions of the various embodiments have been presented for purposes of illustration, but are not intended to be exhaustive or limited to the embodiments disclosed.

Many modifications and variations will be apparent to those of ordinary skill in the art without departing from the scope and spirit of the described embodiments.

Claim 1 is a computer-implemented method for interacting with a wearable computing device, the method comprising: processing a first data stream to determine that a first criterion has been met; determining that the first criterion corresponds to a first no-handed input not involving either hand of an end-user; and mapping the first no-handed input to a first command for execution by the wearable computing device. Claim 2 is the computer-implemented method of claim 1, wherein the wearable computing device comprises a smartwatch that includes a first sensor for capturing the first data stream. Claim 3 is the computer-implemented method of claim 2, wherein the first sensor comprises at least one of an inertial measurement unit, an audio input, and an optical input. Claim 4 is the computer-implemented method of claim 1, wherein the first data stream comprises a set of timestamped values, and wherein determining that the first criterion has been met comprises identifying a subset of the timestamped values corresponding to a first set of inflection points; and determining that the subset of timestamped values occurs within a first time window. Claim 5 is the computer implemented method of claim 4, further comprising determining that the first set of inflection points includes at least a first threshold number of inflection points. Claim 6 is the computer-implemented method of claim 4, further comprising determining that each inflection point in the first set of inflection points corresponds to at least one timestamped value in the subset of timestamped values that exceeds a first threshold value.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

The invention claimed is:

1. A computer-implemented method for interacting with a wearable computing device, the method comprising:
   processing a first data stream comprising a set of timestamped values to determine that a first criterion has been met by:
      processing the first data stream to identify first context data indicating a functional state of the wearable computing device;
      updating, based on the first context data, a default criterion by adjusting parameters of a first time window and a first threshold value to generate the first criterion;
      identifying a subset of timestamped values included in the set of timestamped values that correspond to a first set of inflection points;
      determining that the subset of timestamped values occurs within the first time window; and
      determining that each inflection point included in the first set of inflection points corresponds to a timestamped value in the subset of timestamped values that exceeds the first threshold value;
   determining that the first criterion corresponds to a first no-handed input not involving either hand of an end-user; and mapping the first no-handed input to a first command for execution by the wearable computing device.

2. The computer-implemented method of claim 1, wherein the wearable computing device comprises a smartwatch that includes a first sensor for capturing the first data stream.

3. The computer-implemented method of claim 2, wherein the first sensor comprises at least one of an inertial measurement unit, an audio input, or an optical input.

4. The computer implemented method of claim 1, further comprising determining that the first set of inflection points includes at least a first threshold number of inflection points.

5. The computer-implemented method of claim 1, wherein the first criterion further indicates a threshold level of the translational movement of the wearable computing device relative to a surface.

6. The computer-implemented method of claim 1, wherein the first command is executed based on at least one of a translational movement magnitude or a translational movement directionality.

7. A non-transitory computer-readable medium storing program instructions that, when executed by a processor, causes the processor to perform the steps of:
processing a first data stream comprising a set of timestamped values to determine that a first criterion has been met by:
processing the first data stream to identify first context data indicating a functional state of a wearable computing device;
updating, based on the first context data, a default criterion by adjusting parameters of a first time window and a first threshold value to generate the first criterion;
identifying a subset of timestamped values included in the set of timestamped values that correspond to a first set of inflection points;
determining that the subset of timestamped values occurs within the first time window; and
determining that each inflection point included in the first set of inflection points corresponds to a timestamped value in the subset of timestamped values that exceeds the first threshold value;
determining that the first criterion corresponds to a first no-handed input not involving either hand of an end-user; and
mapping the first no-handed input to a first command for execution by the wearable computing device.

8. The non-transitory computer-readable medium of claim 7, wherein the wearable computing device comprises a smartwatch that includes a first sensor for capturing the first data stream.

9. The non-transitory computer-readable medium of claim 8, wherein the first sensor comprises at least one of an inertial measurement unit, an audio input, or an optical input.

10. The non-transitory computer-readable medium of claim 7, further comprising processing a second data stream to determine that a second criterion has been met, wherein the step of determining that the second criterion has been met comprises determining that the wearable computing device has impacted a solid object or a fluid.

11. The non-transitory computer-readable medium of claim 7, further comprising processing a second data stream to determine that a second criterion has been met, wherein the second criterion indicates when the wearable computing device receives a touch input from an object external to the end-user.

12. The non-transitory computer-readable medium of claim 7, wherein the first data stream comprises first sensor data captured by the wearable computing device and second sensor data is captured by a peripheral device coupled to the wearable computing device.

13. The non-transitory computer-readable medium of claim 12, wherein at least one of the first sensor data or the second sensor data indicates that at least one body part of the end-user is moving.

14. A system, comprising:
a memory storing a control engine; and
a processor that, upon executing the control engine, performs the steps of:
processing a first data stream comprising a set of timestamped values to determine that a first criterion has been met by:
processing the first data stream to identify first context data indicating a functional state of a wearable computing device,
updating, based on the first context data, a default criterion by adjusting parameters of a first time window and a first threshold value to generate the first criterion,
identifying a subset of timestamped values included in the set of timestamped values that correspond to a first set of inflection points,
determining that the subset of timestamped values occurs within the first time window, and
determining that each inflection point included in the first set of inflection points corresponds to a timestamped value in the subset of timestamped values that exceeds the first threshold value,
determining that the first criterion corresponds to a first no-handed input not involving either hand of an end-user, and
mapping the first no-handed input to a first command for execution by a wearable computing device.

15. The system of claim 14, further comprising a first sensor that captures the first data stream, wherein the first sensor comprises at least one of an inertial measurement unit, an audio input, or an optical input.

16. The system of claim 14, further comprising a wearable computing device that includes the memory, the processor, and the first sensor.

17. The system of claim 16, further comprising a peripheral device coupled to the wearable computing device and including a sensor that captures a second data stream, wherein the second data stream is used in determining that the first criterion is met.

* * * * *